Figure 1:
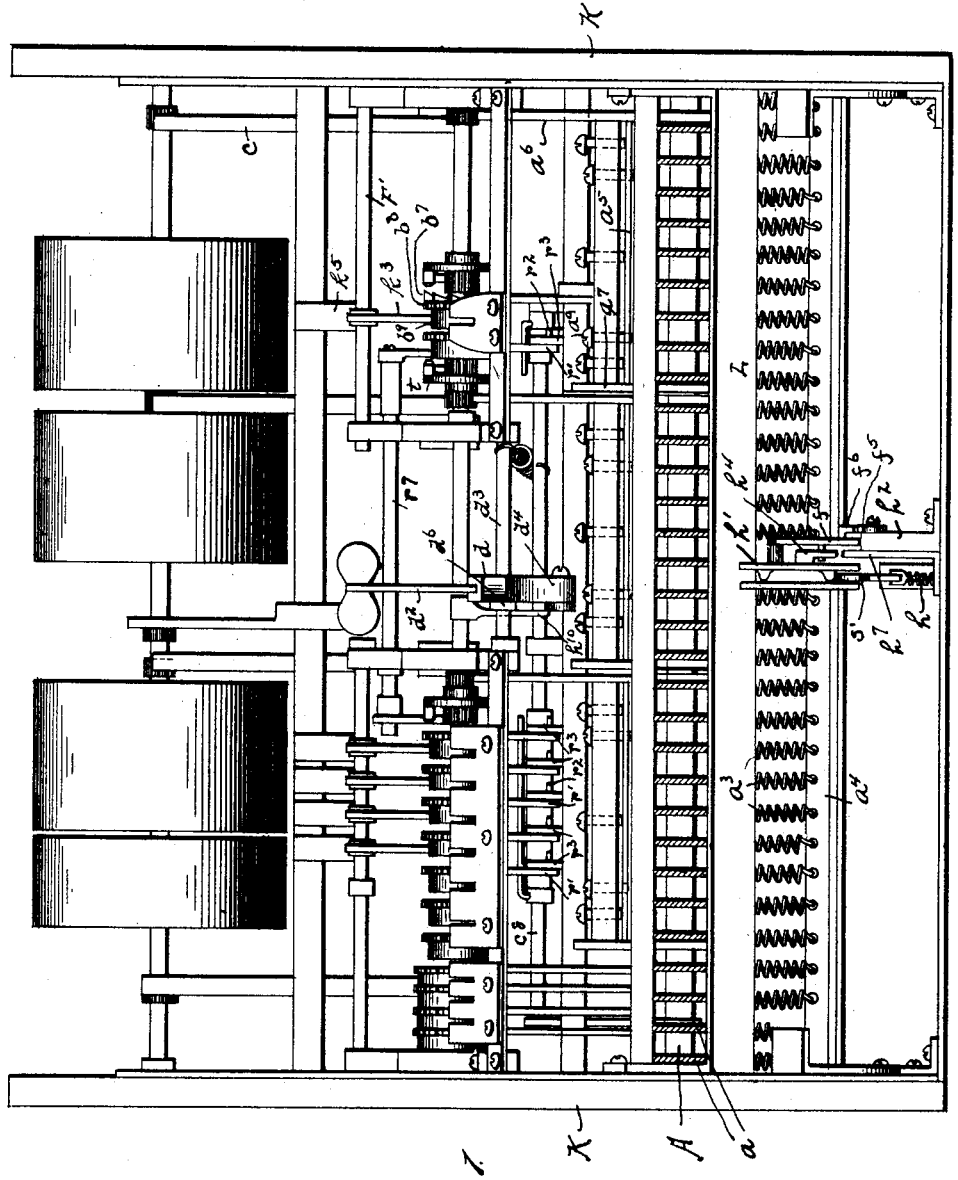

No. 686,683. Patented Nov. 12, 1901.
R. WATSON & W. T. McGRAW.
CASH REGISTER.
(Application filed Nov. 30, 1900.)

(No Model.) 8 Sheets—Sheet 1.

WITNESSES
Chas. E. Wiener
May E. Kott

INVENTORS
Richard Watson
William T. McGraw
Parker T Burton
By Attorneys.

No. 686,683. Patented Nov. 12, 1901.
R. WATSON & W. T. McGRAW.
CASH REGISTER.
(Application filed Nov. 30, 1900.)

(No Model.) 8 Sheets—Sheet 5.

WITNESSES
Chas. E. Wiener
May E. Kott

INVENTORS
Richard Watson
William T. McGraw
By Parker & Burton
Attorneys.

No. 686,683. Patented Nov. 12, 1901.
R. WATSON & W. T. McGRAW.
CASH REGISTER.
(Application filed Nov. 30, 1900.)
(No Model.) 8 Sheets—Sheet 6.
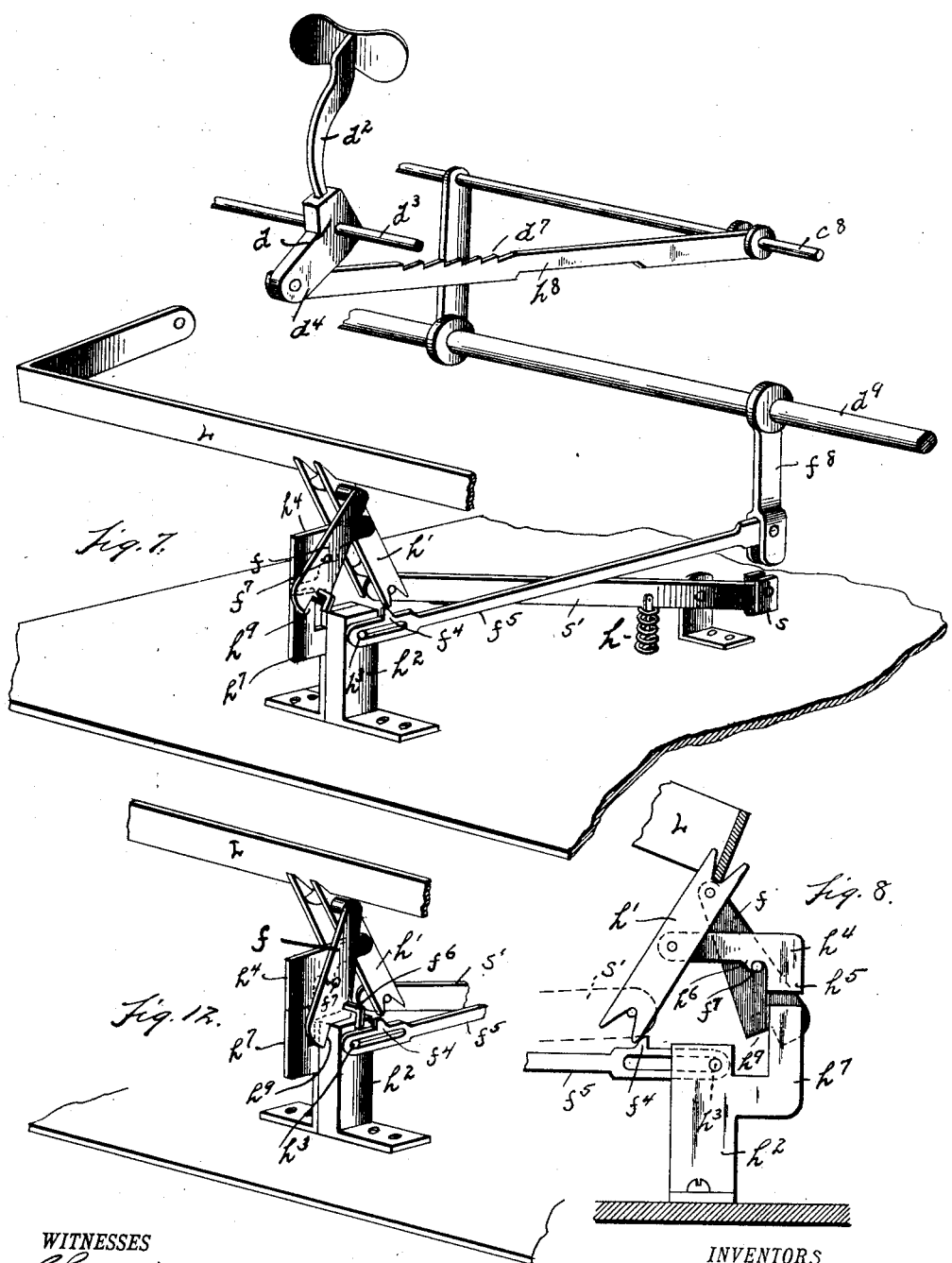
WITNESSES
INVENTORS
Richard Watson
William T. McGraw
By Parker & Burton
Attorneys.

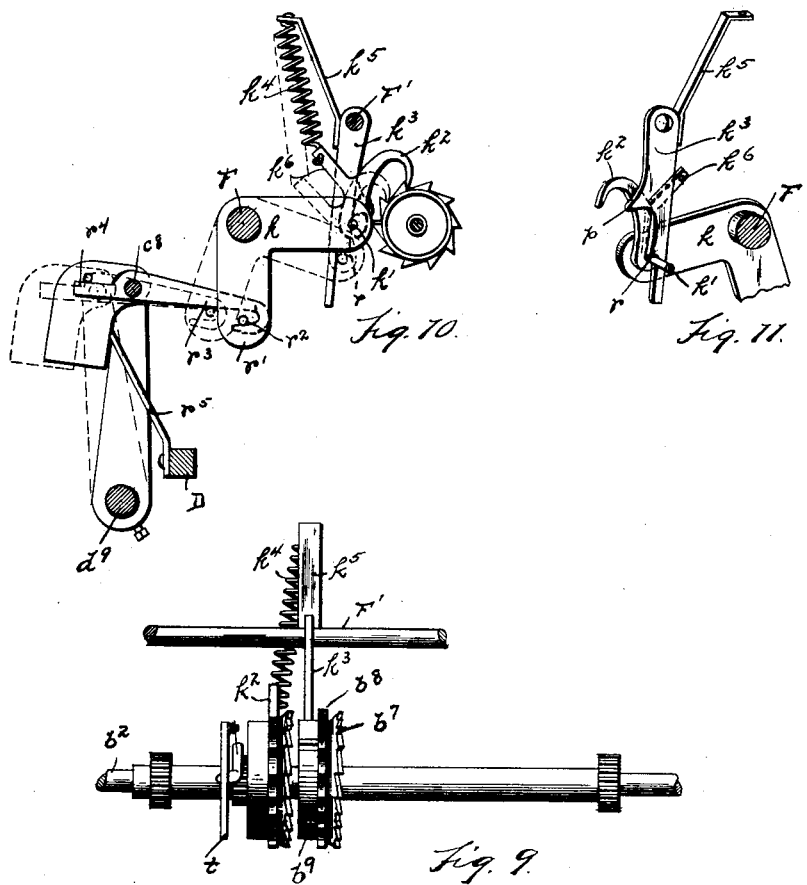

No. 686,683. Patented Nov. 12, 1901.
R. WATSON & W. T. McGRAW.
CASH REGISTER.
(Application filed Nov. 30, 1900.)
(No Model.) 8 Sheets—Sheet 8.
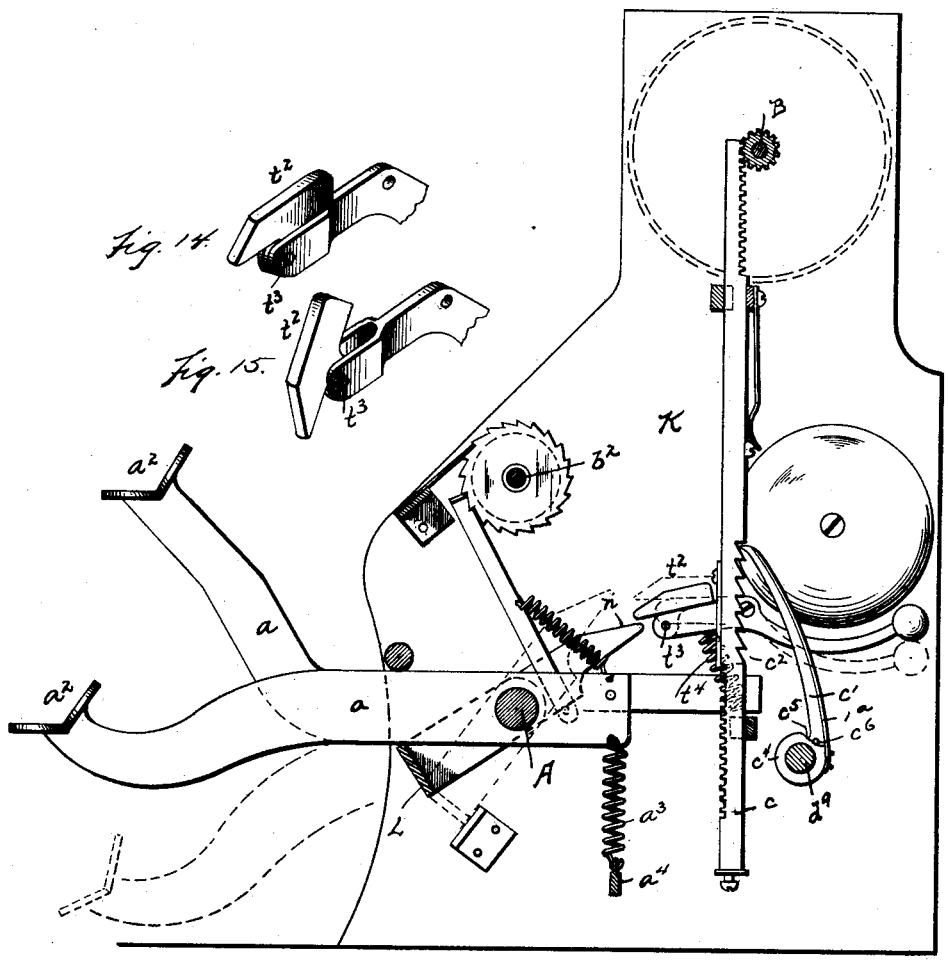
Fig. 13.
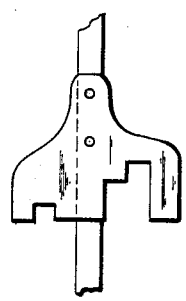
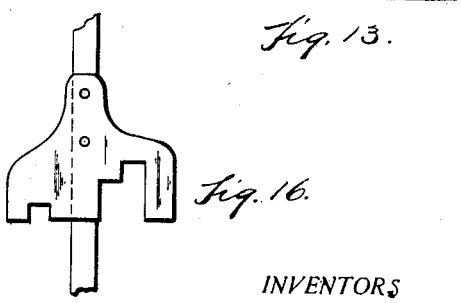
WITNESSES
Chas. E. Wiener
May E. Kott
INVENTORS
Richard Watson
William T. McGraw
By Parker & Burton
Attorneys.

UNITED STATES PATENT OFFICE.

RICHARD WATSON AND WILLIAM T. McGRAW, OF DETROIT, MICHIGAN, ASSIGNORS TO THE GLOBE CASH REGISTER COMPANY, LIMITED, OF DETROIT, MICHIGAN.

CASH-REGISTER.

SPECIFICATION forming part of Letters Patent No. 686,683, dated November 12, 1901.

Application filed November 30, 1900. Serial No. 38,106. (No model.)

*To all whom it may concern:*

Be it known that we, RICHARD WATSON and WILLIAM T. McGRAW, citizens of the United States, residing at Detroit, in the county of Wayne, State of Michigan, have invented certain new and useful Improvements in Cash-Registers; and we declare the following to be a full, clear, and exact description of the invention, such as will enable others skilled in the art to which it pertains to make and use the same, reference being had to the accompanying drawings, which form a part of this specification.

This invention relates to cash-registers, and has for its object improvements in that class of registers in which figures representing amounts of money are shown at an indicating position and other figures representing sums of money are shown at another indicating position, (called "registering indication,") and at each actuation the sum represented by the figures at the indicating position is added to the sum represented by the figures at the registering indication. Commercially this character of cash-register is known as a "total-adder" or a "total-adding cash-register," and the improvements which form the object of this invention are employed to produce, first, an accurate presentation of the indicating-figures, which show what key of the instrument has been struck; second, to produce a correct addition on the register-wheels of the sum indicated to the sum which had been previously registered, and, third, to introduce into the machine checks to prevent the improper manipulation of the machine and to compel a complete cycle of actions whenever any one act of the cycle has been performed or even partly performed.

Figure 2:
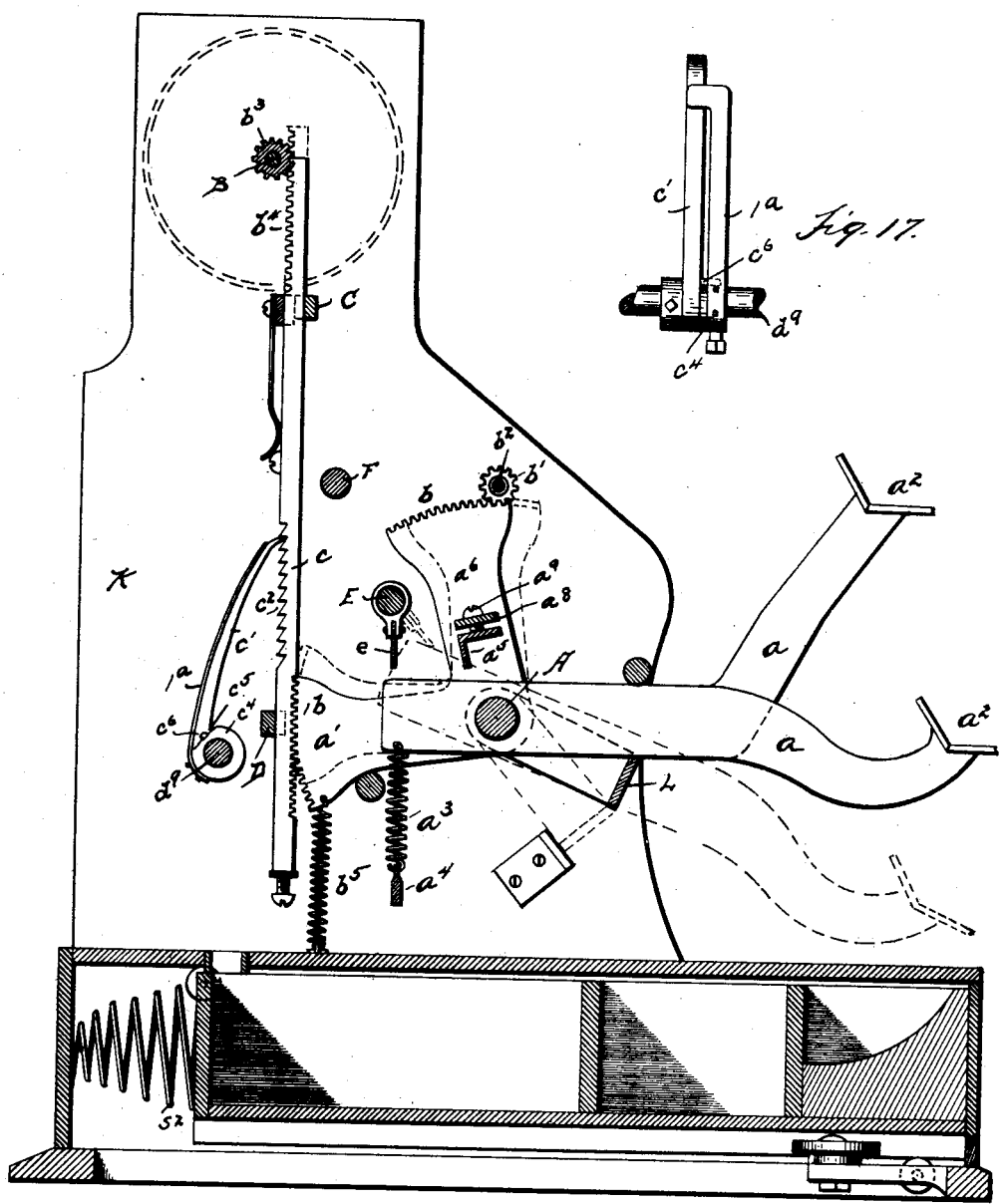
Figure 3:
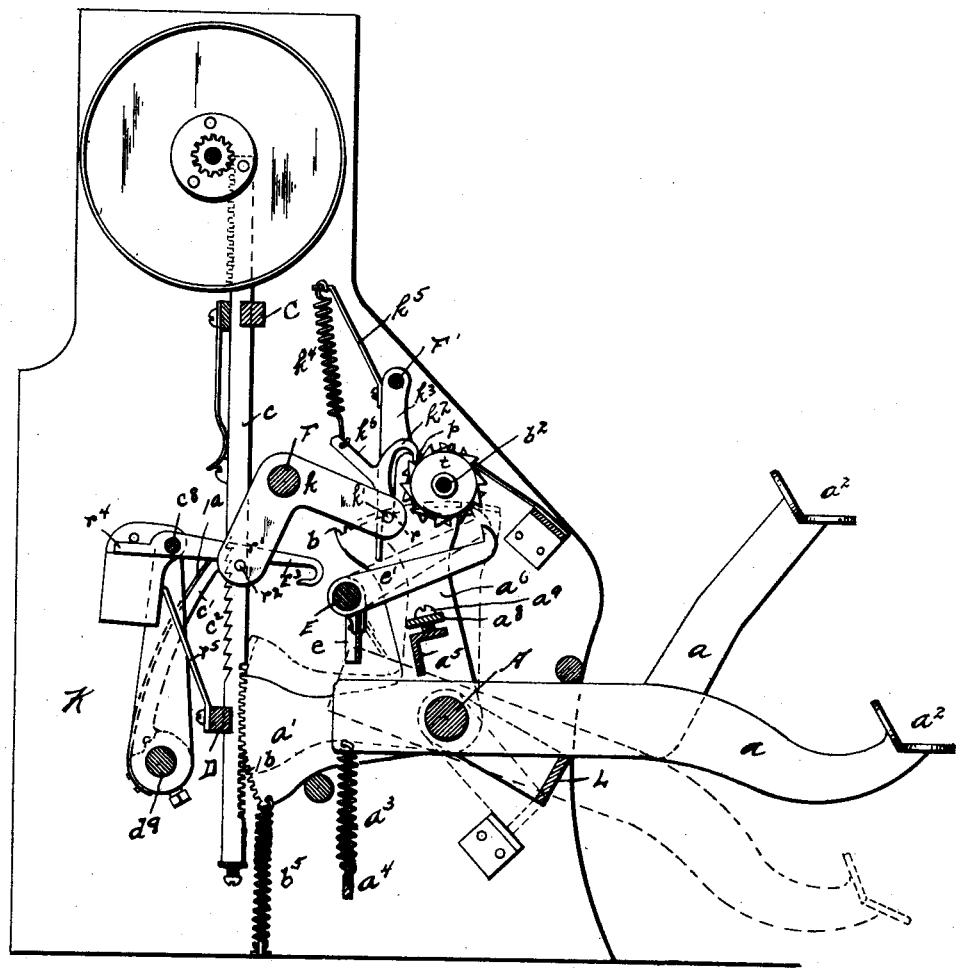
Figure 4:
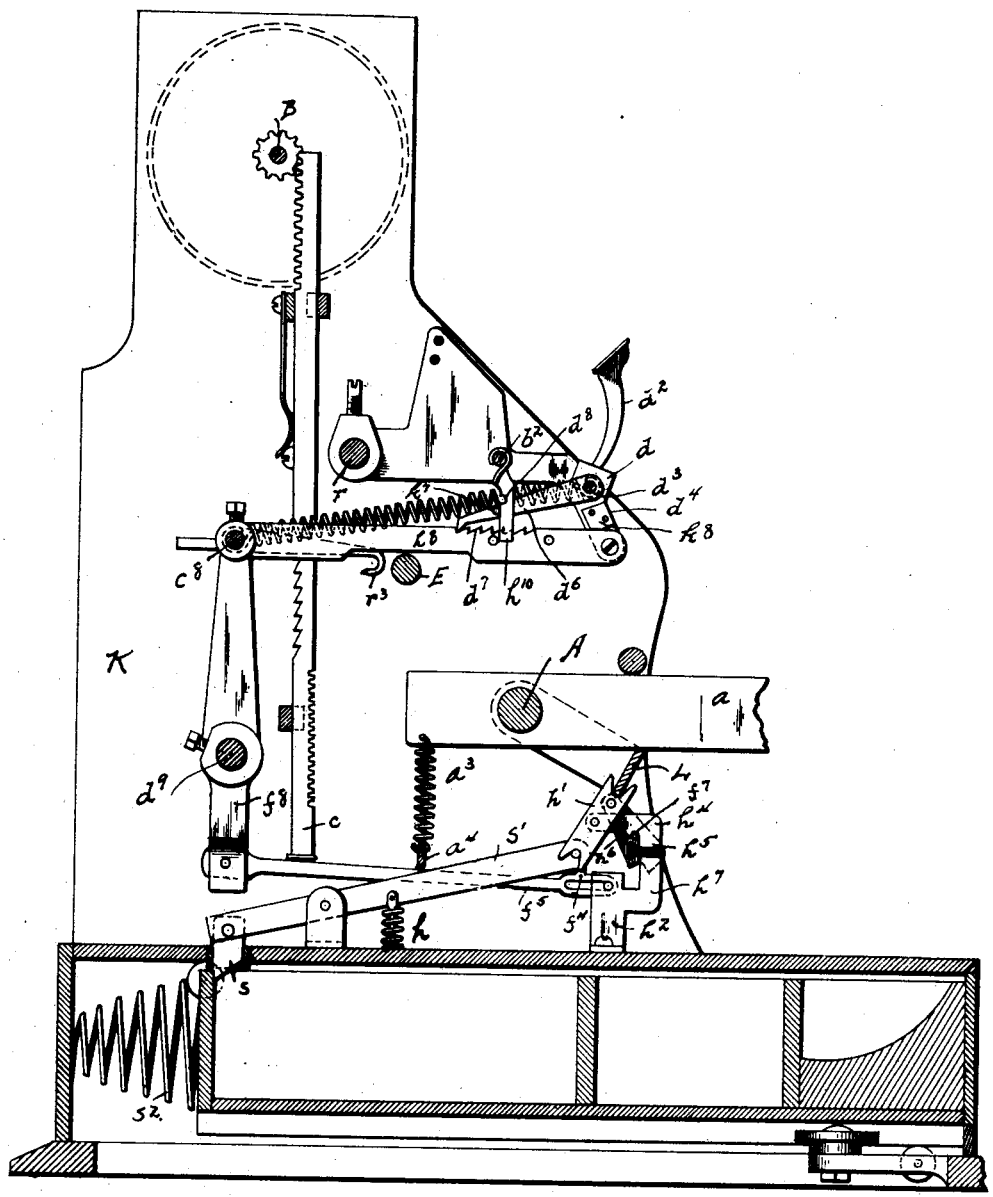
Figure 6:
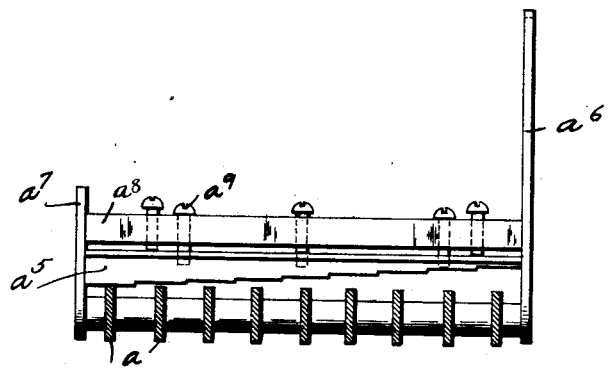
Figure 5:
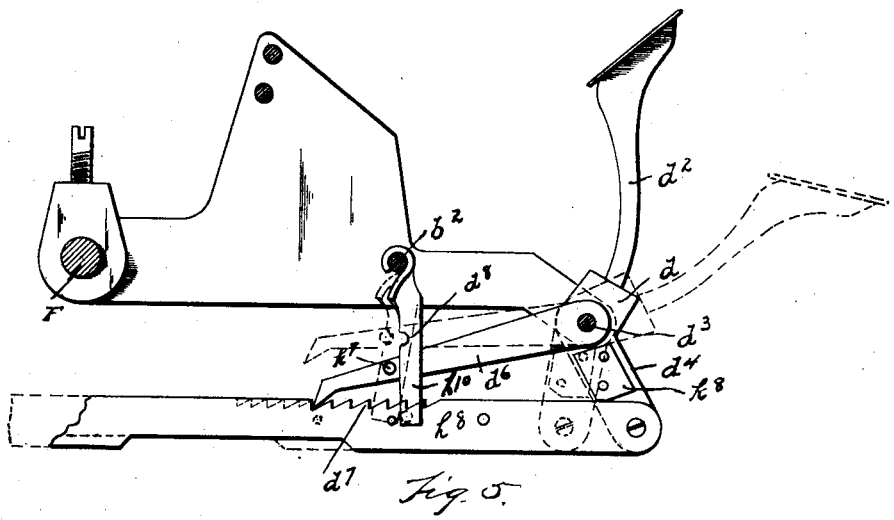

In the drawings, Figure 1 is an elevation, mainly in section, of the machine. Fig. 2 shows a key and the parts actuated by the key to rotate the indicator and to rotate the primary wheel of the register. Fig. 3 is a view showing the same parts that are seen in Fig. 2 and additional parts connected with the registering mechanism. Fig. 4 is a view showing additional parts employed to actuate the registering mechanism. Fig. 5 shows the readjusting-key. Fig. 6 shows a stepped rock-bar employed to act in conjunction with the keys to produce the proper rotation of both indicating and registering mechanism. Fig. 7 shows in detail the readjusting-lever and the chain of mechanism connecting it with the drawer-lock and also with the lock-bar, which prevents the improper actuation of the primary keys. Fig. 8 shows in detail the lock-bar, which prevents the improper actuation of the primary keys. Fig. 9 shows the registering-shaft and registering-wheels. Fig. 10 shows a registering-wheel and the means for actuating it. Fig. 11 is a detail of part of the mechanism shown in Fig. 10. Fig. 12 is a detail of the parts shown in Fig. 7, the parts being shown in a different position in the two figures. Fig. 13 is a detail of the extraordinary keys which are employed to open the drawer and allow access to the money-drawer, but which do not actuate the registering mechanism, but do actuate their own indicating mechanism. Figs. 14 and 15 are details of the end of the bell-hammer. Fig. 16 shows the stop limiting the throw of the special keys. Fig. 17 is a detail of the pawl which holds the indicator-actuating bar.

For a convenience of description the mechanism which embodies the several improvements will be divided into four parts. Some of the improvements are common to all four of the parts, and others are peculiar to a single one of the four parts.

The first part is that part of the machine which indicates and registers amounts of nine cents or less. This part contains a register-wheel that is the first one of a set of wheels on which totals are registered, and connected with this part is a carrying mechanism that couples it to the next part to be described.

The second part to be described is that part of the machine which indicates and registers amounts between ten cents and ninety cents, inclusive. In this part is contained a registering-wheel which is the second one in a series, and this second wheel is coupled to the third part by a carrying mechanism.

The third part indicates and registers amounts of one dollar to nine dollars, inclusive. This part of the machine also contains the register-wheels of higher order and carrying mechanism to provide for a total of any amount.

In the machine shown in Fig. 1 there are shown register-wheels sufficient to indicate nine million nine hundred and ninety-nine thousand nine hundred and ninety-nine dollars and ninety-nine cents.

The fourth part of the machine is devoted to the extraordinary keys, by means of which the drawer is opened at times when it is not desired to register or indicate. In the machine shown in the drawings there are four of these extraordinary keys, and each has its own indicating-mark on the drum or tablet, which may bear any desired legend—as, for instance, one key indicates simply that the drawer has been opened, and with this key is connected a wheel somewhat similar to the register-wheel which will indicate within the limits of the wheel the number of times the drawer has been opened without making a registry. Other keys, with their appropriate registering-wheels may be used to indicate that an amount has been changed in accordance with a slip put into the drawer or that an amount has been paid out in accordance with a slip put in the drawer or that an amount has been paid on account and not added to the total appearing on the register-wheel. The drawer is closed against a spring and is caught and locked by a spring-latch. The spring-latch is lifted whenever a key is actuated, and the actuation of a key rotates an indicating-drum and brings the appropriate figures or words on the indicating-drum to indicating position, and at the same time the drawer is thrown outward and opened by a spring which is located behind it for that purpose. This statement applies to the extraordinary keys as well as to the ordinary keys. The depression of the actuator-key rotates the register-wheel appropriate to the order of units to which the key belongs. Thus if the key be included in that part of the machine which is devoted to the registration of the sum of nine cents or less the wheel of the lowest order, or units order, will be rotated. If either at the same time or succeeding this a key of the second order in that part of the machine which is devoted to the registration of sums between ten cents and ninety cents be depressed, the register-wheel of the second order will be actuated. If at the same time or immediately succeeding such actuation by the key of the second order and while the keys of the first and second order are still held down a key of the third order be operated, the register-wheel of the third order will be actuated. Whatever may have been the position of the register-wheel before this actuation there is no carrying result produced by actuating the keys of either the first, second, or third order. After these keys have been released and have returned to their normal position they cannot be again actuated until the carrying-key (generally hereinafter called the "readjusting-lever") has been first actuated. The carrying from one order of register-wheels to another is not automatically effected by the rotation of the register-wheels, but is effected by actuating the readjusting-lever, and the actuation of this lever produces the proper carrying from any register-wheel to the wheel of the next higher order, and if there be several register-wheels in position such that the amount to be added would require a carrying from each one of them the carrying will be properly effected when the readjusting-lever is actuated once for each carrying operation to be performed, and until that lever is actuated each register-wheel will be brought to a position to indicate only the unit figures of the sum.

K indicates the main framework, which supports the mechanism.

A indicates the main shaft, which extends from side to side of the frame K and on which are strung the primary actuators or key-levers $a$. The key-levers $a$ terminate outside of the case with buttons $a^2$, which are numbered to correspond with the indicating character to be shown when the protruding end of the lever is pushed downward. Inside the case the lever is connected by a spring $a^3$ to a fixed bar $a^4$, and the spring tends to bring the lever back to the position from which it has been manually forced. The inside end of the lever $a$ swings into engagement with a stepped rock-bar $a^5$, that extends between two rock-arms $a^6$ and $a^7$. The rock-arms $a^6$ $a^7$ are journaled on the main shaft A. The stepped part $a^5$ of the bar is held adjustably to a stretcher-bar $a^8$ by screws $a^9$, that extend through the stretcher-bar and some of which, $a^9$, are screwed into and others of which are screwed against the stepped part of the bar. The rock-arm $a^6$ terminates with an arched rack $b$, that engages a pinion $b'$, sleeved on a rod $b^2$. The rod $b^2$ serves as an axle for the wheels of the registering mechanism. A branch arm $a'$ of the rock-arm also terminates with an arched rack $1^b$, that engages with a straight rack on an indicator-actuating bar $c$. A pawl $c'$ engages with a rack $c^2$ on the bar $c$ and is held in close engagement by a spring $1^a$, that extends from an adjustable collar $c^4$. The collar $c^4$ is provided with a notch $c^5$, and the stem of the pawl $c'$ is provided with a pin $c^6$, that engages in this notch $c^5$. The pawl $c'$ and the collar $c^4$ are both on a shaft $d^9$.

The indicator-actuating bar $c$ is provided at its upper end with a rack $b^4$, that engages with a pinion $b^3$ on a shaft B, and the shaft B carries the indicator-drum for this section of the register.

C and D are guide-bars that hold the bar $c$ to its place, and $b^5$ is a spring extending from the arm $a'$ to the frame. When the protruding end of the key-lever is depressed, it engages under one of the steps of the bar $a^5$, swings the rock-arms, and the bar $c$ is lifted to an amount to correspond with the index-figure on the key, and the pinion and sleeve on the registering-shaft are rotated to a corresponding amount. There is a disk $t$ on the end of the sleeve, and on the face of the disk a pawl that engages with some one of the ratchet-teeth on the register-wheel. The pawl catches the register-wheel and rotates it forward, but slips over the teeth on the return oscillation of the disk $t$.

Overthrow of the registering-shaft is prevented by the mechanism connected with the rock-shaft E. On this rock-shaft E is carried a number of arms ($e'$ in Fig. 3) and a wing $e$, which extends over the series of keys. As the inner end of the key-lever $a$ rises it engages against the wing $e$ and lifts a pawl $e'$ into engagement with one section of the registering-wheel. The registering-wheel is composed of three sections—a right-hand ratchet-wheel $b^7$, a left-hand ratchet-wheel $b^8$, and a drum $b^9$, containing the register-numbers. There is one register-wheel for the nine keys which form the units-section of the machine, one register-wheel for the nine keys which form that section of the register-wheel employed to register sums between ten and ninety, inclusive, and there is a register-wheel for the nine keys employed to register sums between one dollar and nine dollars, inclusive, and there are a number of register-wheels of higher order on which totals are carried when the amount is greater than nine dollars and ninety-nine cents.

The mechanism for each section, so far as registering the amount indicated, is a duplicate of that of either of the other sections. The carrying mechanism is connected with the readjusting-key and will be described with that key.

After a prime actuating-lever (a key-lever) has been depressed and released it is locked and cannot again be depressed until the readjusting-lever has been actuated.

The locking mechanism can be best understood by reference to Figs. 2, 3, and 4.

Referring to Figs. 7, 8, 12, and 13, under the levers is a stirrup-bar L, swinging from the main shaft A, normally lifted by a spring $h$ and locked in its elevated position by a swinging latch $f$. The swinging latch $f$ is pinned to a link $h'$, that rests on a pin that projects at each side frame from a lever-bar. The latch $f$ has a notch $h^9$ in its free end, and the notch is arranged to engage over the corner of a stud $h^2$, that rises from the frame. A pin $f^6$ projects from the side of the latch $f$ and extends into the path of a lug $f^4$ on a link $f^5$. The link $f^5$ reaches to and is pinned to an arm from the rock-shaft $d^9$. The front end of the link $f^5$ is slotted and engages a pin $h^3$, that projects from the side of the stud $h^2$. To the link $h'$ is pinned a hook $h^4$, provided on its under side with two bills $h^5 h^6$, either of which may engage behind a pin $f^7$, that projects from the side of the latch $f$. The outermost bill $h^5$ projects downward and at times engages against a spur $h^7$ from the stud $h^2$. The shaft $d^9$ is a rock-shaft and is oscillated by the manual oscillation of the readjusting-lever $d^2$, as will be best understood by referring to Fig. 12. The arm $d^2$ is a removable arm adapted to be inserted or removed from a socket $d$, and the socket $d$ is in one branch of a bent lever that is fulcrumed on the shaft or pin $d^3$. From the other branch a link $h^8$ extends to a bar $c^3$, that forms part of a rock-frame on the rock-shaft $d^9$. From the rock-shaft $d^9$ a rock-arm $f^8$ extends downward and has pinned to it the link $f^5$. When the lever $d^2$ is actuated to swing its upper end forward and the end to which the link $h^8$ engages backward, it swings the link $f^5$ forward, and the lug $f^4$ engages the projecting pin $f^6$ and pushes the latch $f$ off from the stud $h^2$. It also pushes the pin $f^7$ under the short bill $h^6$, which now prevents the latch from closing in toward the link $h'$, and leaves as the only part which remains to resist the downstroke of the keys the lock-actuating lever $s'$, and the depression of the key-lever unlocks the drawer. As the key-lever is pushed downward the bill $h^5$ engages the spur $h^7$, and the pin $f^7$ is pushed below the bill $h^6$, and the latch $f$ swings to bring its lower end against the stud $h^2$ and into position to swing still farther back and engage over the top of the stud on the return movement of the key-lever.

The stirrup L bears directly on the link $h'$ and also bears directly under the keys A, so that after the readjusting-lever has been actuated and the keys are free to be depressed any attempt to depress them releases the latch $f$ from the engagement between its pin $f^7$ and the bill $h^6$, and if the key-lever be depressed enough to unlock the drawer the interlocking mechanism just described will come into action and prevent a second manipulation of the key before a full action has been given to the readjusting-key.

When the readjusting-lever has been moved, it must make a complete throw and return before the key-lever can be actuated.

On the shaft $d^3$ is pivoted a pawl $d^6$, that engages in a rack $d^7$ on the bar $h^8$. A pin projecting from the side of this pawl $d^6$ engages in a notch $d^8$ in a hanger $h^{10}$, hanging from the bar $b^2$. On the arm $d^4$ of the readjusting-lever is a block $k^8$, that lifts the pawl when the lower end of the arm has swung in and is nearing the limit of its travel. When the pawl is lifted, the pin $k^7$ engages in the notch, and the point of the pawl is held out from engagement with the teeth of the rack $d^7$; but until the block has lifted the pawl the point of the pawl engages with the teeth of the rack, allowing the bar $h^8$ to move backward under the point of the pawl, but locking it against the return motion until the complete throw has been made, the pawl lifted, and the pin engaged in the notch, and the pawl held out of engagement with the rack.

The action of the readjusting-lever last described has also effected the carrying at all points of the register mechanism. The carrying from the units-wheel to the tens-wheel is duplicated in the carrying for the tens-wheel to the hundreds-wheel and again duplicated in each carrying from the lower order to the higher order. It will be best understood from Figs. 3, 10, and 11. On the shaft F is a bent lever or rock-lever $k$, at the front end of which is a pin $k'$, to which is pivoted a hook $k^2$. The pivot-pin extends to one side and engages under a hanger $k^3$, the bottom end of which is pressed forward by a spring $k^4$, that extends from an upright arm $k^5$ to and engages an arm $k^6$. From the back of the hooks the parts are thus held from two rigid fulcrums F and F', and they tend to close together, so as to lift the hook and at the same time to swing the bottom end of the hanger forward; but the engagement between the pin $k'$ and the notch $r$ holds the part in position so long as they are not disturbed. On the drum of the register-wheel is a projection which may be considered as constituting a one-toothed wheel, and on the hanger $k^3$ is a point $p$, that lies in the path of this one tooth. At the proper time in the revolution of the wheel the tooth of the drum engages the point $p$ and pushes the hanger back until it disengages the notch and the pin $k'$. The spring tension under which the hook is held lifts the hook over a tooth of the ratchet-wheel of the register-wheel of next higher order and at the same time swings the end $r'$ of the rock-arm $k$ forward and brings a pin $r^2$, that extends from the arm $r'$, over the backward-extending bill of a hook $r^3$, that is pivoted to the shaft $c^8$. On the same shaft and closely connected with the hook $r^3$ is a pivoted weight, which is loose from, but arranged to act as, a weight to depress the end $r^4$ of the hook $r^3$. The weight and the hook are pivoted on the same shaft $c^8$. The end $r^3$ of the hook may rise, leaving the weight in position against a stop $r^5$, which holds the weight when the shaft $c^8$ is in its forward position; but when the shaft $c^8$ is pushed to the rear the weight tends to drop around the shaft on which it is suspended, and a projection extending from the weight over the rear end of the hook lifts the front end of the hook unless the hook has been engaged under the pin $r^2$, in which case the hook cannot lift, but serves to act as a link to draw the pin $r^2$ backward, swing the rock-arm $k$, and force down the hook $k^2$, and thus actuates the units-wheel of the order next higher than the one which actuated the hanger $k^3$.

By referring to Fig. 1 it will be seen that the wheels of the first and second order of units are near the right end of the register and that the wheels of higher orders are at the left end of the register. In such case it becomes necessary to make the part which carries the point back and the part which carries the notch in separate pieces and connect them by a rod $r^7$; but the principle of action is the same whether they be made in a single piece or in separate pieces.

The locking and unlocking of the drawer is effected by mechanism shown in Figs. 7 and 8. A vertical locking-bolt $s$ is hung from the rear end of the lever $s'$, the front end of which is arranged to engage by link connection with the stirrup L. When the primary actuating-key $a$ is depressed, carrying down before it the stirrup L, it lifts the locking-bolt out of engagement with the catch on the drawer, and the drawer is thrown out from its case by means of a spring $s^2$. The locking and unlocking of the drawer performs no function in the cycle of operations necessary for the action of the indicating or registering mechanism. It is unlocked contemporaneously with and by the depression of the projecting end of the key-lever, but may be pushed into its case at any time when the key-lever is not held down.

In addition to the ordinary key-levers there are auxiliary levers, each of which opens the drawer and each of which effects an indication on its own individual registry-wheel, so that when any one of the auxiliary levers is operated there will be an indication which will remain until the readjusting-lever is operated, and there will be a register upon an appropriate wheel showing the number of times the particular auxiliary key has been actuated, which registry is, however, limited to a rotation of the individual register-wheel. There is no provision to carry off this registry to show the operation of the key to any greater extent.

Whenever a key-lever is depressed, pushing down before it or under it a stop-bar L, a branch from the bar that extends beyond the rod A, on which the swinging bar L is journaled, presses up the bell-hammer $t^2$. The bell-hammer is a jointed lever arranged to be bent at the joint $t^3$ to allow the end $n$ to pass downward by it without actuating the main part of the bell-hammer, actuating only the bent part, which tips on the main part. When, however, the bar L is depressed, the point $n$ presses up against the point of the bell-hammer until it slips by, and during this movement the head of the bell-hammer has been drawn away from the bell, and it is immediately and forcibly driven back by the spring $t^4$. The bell is sounded whenever a key-lever of any character is depressed and whenever the money-drawer is opened.

What we claim is—

1. In a cash-register, in combination with a register-wheel, a key-lever, means intermediate the key-lever and the register-wheel whereby the lever actuates the register-wheel, a register-wheel of higher order, a hanging pawl adapted to engage the register-wheel, a one-toothed wheel rotating with the register-wheel, adapted to engage the pawl-hanger, and push it into holding engagement with the arm of a swinging lever, a swinging lever adapted to so engage the hanger of said pawl and arranged to have its opposite end swing into operative engagement with mechanism actuated by a readjusting-lever, a manually-operated readjusting-lever and mechanism actuated thereby to produce an advance movement of the register-wheel of higher order, substantially as described.

2. In a cash-register, a series of key-levers, a register-wheel loose on a shaft, a sleeved wheel loose on the same shaft, a pawl connection between the register-wheel and the sleeved wheel, a rack adapted to actuate the sleeved wheel, a rock-frame engaging over the key-levers and provided with a stepped side bar, the said rock-frame being connected with the rack, whereby the rack is actuated to a different degree by each of the several key-levers, substantially as described.

3. In a cash-register, in combination with an indicating-drum rotatable on a shaft, a pinion rotatable therewith, a vertically reciprocating-bar provided with a rack to engage said pinion, and a second rack to engage an arched rocking rack, an arched rocking rack, a plurality of key-levers, a stepped side bar forming a part of the framework of said arched rocking rack arranged to engage over the key-levers, and to cause each of said key-levers when operated to produce a definite reciprocation of the vertical bar, and a definite rotation of the indicator-drum, substantially as described.

4. In a cash-register, in combination with a plurality of key-levers, a stop-bar arranged beneath said key-levers, a readjusting-lever, a latch engaging the stop-bar and links connecting the readjusting-lever to the latch engaging the stop-bar and a part fixed to the frame whereby the actuation of the readjusting-lever releases the latch from engagement with the fixed part and places the parts in condition to allow movement of the key-lever, substantially as described.

5. In a cash-register, in combination with a plurality of keys, a stop-bar beneath said keys, a latch for locking the stop-bar, a readjusting-lever, and links connecting the readjusting-lever, to the latch which locks the stop-bar, and which are arranged to disengage the lock, a casing, a cash-drawer, a locking-bolt arranged to lock the drawer automatically, a lever, one end of which engages said drawer-locking bolt, and the other end of which is engaged by the stop-bar, and actuated thereby in unison with the depression of the key-lever, whereby the drawer is unlocked at the depression of any one of a plurality of keys, substantially as described.

6. In a cash-register, in combination with a primary key-lever, a rotary wheel and means intermediate the lever and the wheel adapted to produce a rotation of one contemporaneously with the action of the other, a hanger and means on the wheel for actuating said hanger, a pawl adapted to engage a second wheel, means for shifting the support of said pawl, and means connected with the hanger whereby the point of the pawl is held from or brought into engagement with its wheel in correspondence with the position of the support of the pawl and the engagement of the same with said hanger, a readjusting-lever, and means intermediate said readjusting-lever manually actuated independently of the primary key-lever and the pawl-support whereby the support may be actuated, substantially as described.

7. In a cash-register, the combination of a primary key-lever, a readjusting-lever, a rock-arm mediately actuated thereby, a draft mechanism arranged to swing on said rock-arm, the said draft mechanism being provided with a hook at one end, and with a counterweight, means for lifting the counterweight from the draft mechanism at one part of its throw, a lever arranged to be actuated by said draft mechanism, and also to be actuated mediately by the primary key, and means whereby the said lever only engages the draft mechanism when it has been previously actuated and set by the primary key, substantially as described.

8. In a cash-register, in combination with the readjusting-lever, a reciprocating toothed link actuated thereby, a pawl journaled on the shaft of the lever and arranged to engage teeth in the link, an offset on the lever arranged to lift the pawl out of engagement with the teeth, means for catching and holding the pawl out of engagement with the teeth, and means for disengaging the catch on the return of the link, substantially as described.

9. In a cash-register, in combination with a plurality of primary actuating key-levers, a stop-bar arranged beneath said key-levers, a latch under said stop-bar, a readjusting-lever adapted to mediately disengage said latch, means for catching and temporarily holding the latch disengaged, means whereby the primary key when actuated releases the catch and places the latch in position to automatically reëngage as a stop to a second movement of the primary key, substantially as described.

10. In a cash-register the combination of a primary actuating-key, means arranged to lock the same against movement, a readjusting-lever and means actuated thereby for releasing the locking mechanism of the primary actuating-key, and means whereby the primary actuating-key after a movement following the said unlocking movement, is again locked on its return to its primary position, substantially as described.

In testimony whereof we sign this specification in the presence of two witnesses.

RICHARD WATSON.
WILLIAM T. McGRAW.

Witnesses:
CHARLES F. BURTON,
JOHN N. GOODRICH.